United States Patent [19]

Nonnenmann et al.

[11] 4,202,296
[45] May 13, 1980

[54] COOLING SYSTEM FOR INTERNAL COMBUSTION ENGINES

[75] Inventors: Manfred Nonnenmann, Schwieberdingen; Kurt Hauser; Gebhard Schwarz, both of Stuttgart, all of Fed. Rep. of Germany

[73] Assignee: Süddeutsche Kühlerfabrik Julius Fr. Behr GmbH & Co. K.G., Stuttgart, Fed. Rep. of Germany

[21] Appl. No.: 860,089

[22] Filed: Dec. 13, 1977

[30] Foreign Application Priority Data

Dec. 21, 1976 [DE] Fed. Rep. of Germany ....... 2657840

[51] Int. Cl.² .............................................. F01P 5/06
[52] U.S. Cl. ............................. 123/41.48; 123/41.49; 415/206; 415/208; 415/216; 415/DIG. 1; 165/125
[58] Field of Search ............... 123/41.48, 41.49, 41.11; 415/206, 208, 216, DIG. 1; 165/122, 125

[56] References Cited

U.S. PATENT DOCUMENTS

| | | | |
|---|---|---|---|
| 2,368,732 | 2/1945 | Wallgren | 165/125 |
| 2,733,106 | 5/1956 | Kulling | 415/206 |
| 2,737,933 | 3/1956 | Swenson | 123/41.48 |
| 3,070,287 | 12/1962 | Eck | 415/206 |
| 3,144,859 | 8/1964 | Walton | 123/41.49 |
| 3,335,654 | 8/1967 | Killam | 415/206 |
| 3,394,876 | 7/1968 | Eck | 415/206 |
| 3,601,184 | 8/1971 | Hauville | 165/125 |
| 3,780,411 | 12/1973 | Bulin | 415/206 |
| 4,062,401 | 12/1977 | Rudny et al. | 123/41.49 |
| 4,086,886 | 5/1978 | Edmaier et al. | 123/41.49 |

FOREIGN PATENT DOCUMENTS

| | | | |
|---|---|---|---|
| 810214 | 5/1951 | Fed. Rep. of Germany | 123/41.49 |
| 1922452 | 1/1970 | Fed. Rep. of Germany | 123/41.49 |
| 1576708 | 5/1970 | Fed. Rep. of Germany | 123/41.49 |
| 1925809 | 12/1970 | Fed. Rep. of Germany | 165/125 |
| 2050265 | 4/1972 | Fed. Rep. of Germany | 123/41.49 |
| 1576705 | 4/1973 | Fed. Rep. of Germany | 123/41.49 |
| 1551519 | 6/1973 | Fed. Rep. of Germany | 165/125 |
| 2442174 | 10/1975 | Fed. Rep. of Germany | 165/125 |
| 2435839 | 2/1976 | Fed. Rep. of Germany | 123/41.49 |
| 2502633 | 7/1976 | Fed. Rep. of Germany | 123/41.49 |
| 2610673 | 9/1976 | Fed. Rep. of Germany | 165/125 |
| 2540040 | 3/1977 | Fed. Rep. of Germany | 123/41.49 |
| 1269422 | 7/1961 | France | 165/125 |
| 153175 | 11/1920 | United Kingdom | 165/125 |
| 425319 | 3/1935 | United Kingdom | 165/125 |

*Primary Examiner*—Charles J. Myhre
*Assistant Examiner*—Jeffrey L. Yates
*Attorney, Agent, or Firm*—Browdy and Neimark

[57] ABSTRACT

A quiet cooling system for internal combustion engines includes a radial impeller and a ring radiator. The ring radiator is disposed in the vicinity of the circumference of the radial impeller and is spaced at a distance from the impeller. The ring radiator can be made integral or in the form of segments. The radiator includes cooling water tubes which are to carry water and have fins fastened thereto. The cooling water tubes run parallel to the fan axis and are positioned parallel to the flow direction of cooling air leaving the radial impeller.

25 Claims, 7 Drawing Figures

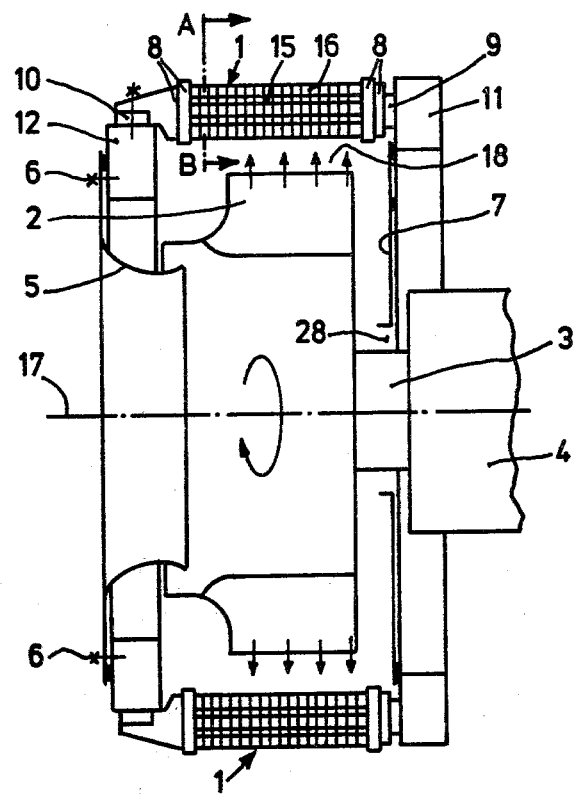
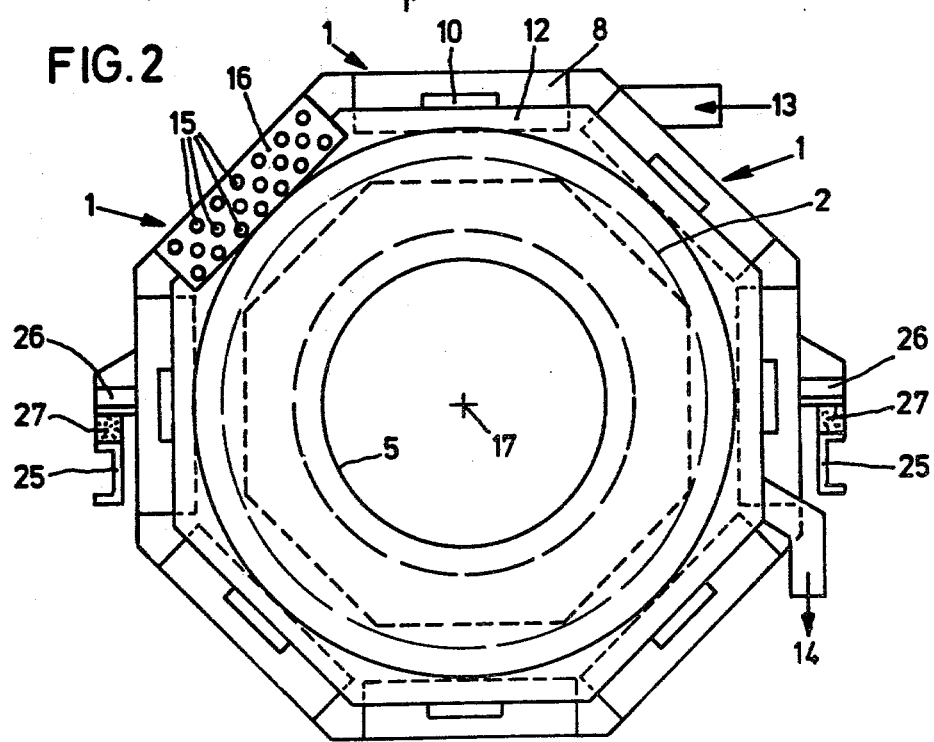

COOLING SYSTEM FOR INTERNAL COMBUSTION ENGINES

BACKGROUND OF THE INVENTION

This invention relates to a quiet cooling system for internal combustion engines which includes a radial fan and a ring radiator, the radiator being mounted at the circumference of a radial impeller at a distance from the latter. The invention relates, more particularly, to such a system in which the radiator is made integral or of radiator segments, the radiator including tubes conducting water, cooling fins being fastened to the tubes.

By the mid 1980's, the permissible noise level of motor vehicles equipped with internal combustion engines will be approximately 10 dB(A) below the values currently permitted. In addition to reducing noise emitted by the internal combustion engine and its components, the noise level produced by the cooling system associated with the internal combustion engine will also have to be decreased approximately 10 dB(A).

Numerous proposals have been made in attempts to achieve the noise reduction goal. The proposals, in most cases, provide for increasing the front surface of conventional, flat radiators. This is intended to result in a corresponding reduction of the pressure loss, so that circumferential velocity of the fan, which is especially critical for noise production, can be reduced.

Such cooling systems, however, require so much space that they cannot be accommodated in the engine compartments of motor vehicles. For this reason, some proposals provide for installation behind the cab of a vehicle or on the cab roof of the vehicle. Both designs have considerable disadvantages, namely, shortening of the truck floor and/or an unfavorable load on the cab, as well as an increase danger of scalding in the event of accidents.

Cooling systems with ring radiators and radial fans are also known. However, known designs suffer from numerous disadvantages.

Usually, radiators with radially disposed ribs are used, the ribs being aligned with circularly bent cooling tubes. This results in a considerable loss of thrust for the air, since the cooling air enters the radiator with a large circumferential component.

To avoid these thrust losses, several known designs bend the cooling ribs in such manner that their entrance angle corresponds to the influx angle, such as the respective radiators disclosed in British Pat. No. 153,175; and in German Federal Republic Pat. No. 1,576,705. Manufacturing cooling ribs shaped in this fashion, however, increases the cost of the radiator. It is also difficult to achieve the correct entrance angle, so that considerable thrust losses can still develop. Moreover, the influx angle of the cooling air varies with the operating state of the vehicle, so that a smooth design can be achieved only for a specific operating point, depending on the vehicle speed and/or the exit angle. In other known ring radiators, disk-shaped plates are used to guide the water using cooling ribs disposed between the plates and so as to be radial or inclined in the direction of the incoming flow of cooling air, such as disclosed in German Federal Republic Auslegeschrift (Published Patent Application) No. 1,551,519 and German Federal Republic Offenlegungsschrift (Laid Open Patent Application) No. 1,925,809.

However, the manufacture of these designs is still costly and radiators so constructed still suffer from high, undesirable thrust losses.

Ring radiators built up of segments are also known as rotating heat exchangers, whose tubes run parallel to the axis of rotation. In this manner, the rotating heat exchanger itself acts as a fan, for example, as disclosed in German Federal Republic Offenlegungsschrift (Laid Open Patent Application) No. 2,610,673.

In order to maintain the necessary cooling area, the radiator width of known systems is usually greater than the exit width of the radial fan (German Auslegeschrift No. 1,551,519, Supra; German Pat. No. 1,576,705, supra). In order to achieve an air distribution which is as uniform as possible over the entire width of the radiator, conical guide rings are disposed side by side between the fan and radiator, so that a plurality of diffusing rings forms a cross section which increases gradually from the impeller outlet width to the width of the radiator, for example, as disclosed in German Federal Republic Offenlegungsschrift (Laid Open Patent Application) No. 2,050,265. This measure also increases manufacturing costs, and results in an increase in the diameter of the cooling system.

SUMMARY OF THE INVENTION

An object of the present invention is to provide a quiet cooling system which includes a ring radiator and a radial impeller which can simultaneously be made so compact that the system can be accommodated in the engine compartment of a vehicle.

It is another object of the present invention to provide a quiet cooling system which effects a largely smooth entry of the cooling air over the entire operating range, without resorting to guide rings and cooling ribs in the shape of guide plates.

It is a further object of the present invention to provide a quiet cooling system in which a more uniform load is imposed on the radiator with the smallest possible radiator diameter, so that a cooling assembly which is simple to manufacture can be used.

The foregoing objects, as well as others which are to become clear from the text below, are achieved according to the invention in a cooling system of the type described hereinabove essentially by virtue of the fact that the cooling water tubes are located parallel to the rotational axis of the impeller, the fins being located parallel to the flow direction of the cooling air leaving the radial impeller.

For the radial impeller to be provided with a rounded cover plate is particularly advantageous so that an inlet nozzle can project into this radial impeller. The inlet nozzle is desirably shaped so that the slot air entering between the radial impeller and the inlet nozzle and the main flow contain an outwardly directed component. The slot air is supplied tangentially or nearly tangetially to the rounded edge of the radial impeller cover plate.

The cooling system according to the invention is provided with a ring radiator with an arrangement of cooling water tubes and cooling ribs which favors flow, in conjunction with a relatively broad radial impeller and an especially shaped inlet nozzle.

Various possibilities can be employed for the structural design of a cooling system according to the invention.

According to one embodiment, it is advantageous for the inlet nozzle to be connected with a cover plate on the radial impeller and to turn with the latter.

According to another embodiment of the invention it is advantageous for the ratio of the impeller outlet surface to the narrowest cross section of the inlet nozzle to be greater than 1.2.

The cooling water tubes, provided with cooling fins, are disposed, for example, between two annular water jackets. It is particularly advantageous in this connection to make the ring radiator of individual cooling segments, these segments being disposed on the circumference of a frame, consisting of shaped, lightweight parts, and being arranged in the form of a ring or polygon at a distance from the circumference of the impeller. It has also been found advantageous to use a basket-like member as a support structure, on whose circumference individual cooling elements are mounted; the latter can also be made first, resulting in a polygon. However, it can also be made of lightweight shaped plates or cast parts. Other members can be used, for example heat exchangers for motor vehicle heaters, which are very economical to manufacture because of the large numbers in which they are produced.

A design which results in a heat exchanger is used for the ring radiator surrounding the radial impeller, with the cooling water being guided through tubes having a cross section that promotes the flow of the cooling air, for example, round tubes. The cooling water tubes run parallel to the fan axis. Cooling fins are mounted in rows on the cooling water tubes, the fins being located parallel to the flow direction of the cooling air leaving the radial impeller, so that, with the exception of the boundary zones, no inlet shock results when the direction of the inflowing air changes. In this manner, the pressure losses in the radiator are considerably reduced relative to known designs; this has a favorable effect both upon the power requirements of the fan and also the noise level.

The structure of the basket-like member, according to another embodiment of the invention, is constituted at least partially of hollow members in such manner that these hollow members serve as manifolds for the cooling water, supplying it and carrying it away, and thus constitute the water distribution system.

It is particularly advantageous if the individual radiator segments are connected directly together on the water jackets, and the water jackets form a water distributor channel.

Another advantage over known designs consists in a significant improvement in the manner in which air is fed to the radiator, without requiring costly and cumbersome guides. This is accomplished by using a relatively broad radial impeller in conjunction with a specially shaped inlet nozzle.

Some known ring radiator designs also have broad radial fans, as disclosed for example, in German Federal Republic Offenlegungsschrift (Laid Open Patent Application) No. 1,576,708. Such radiators are so designed that the impeller outlet cross section is greater than the cross section of the axial inlet opening. It has been found however that in such designs, without an inlet nozzle according to the present invention, the flow separates at the rounded edge of the impeller cover plate, so that only a portion of the total outlet width of the impeller has the cooling air flowing through it. As a result, the amount of air fed to the radiator is reduced and the efficiency of the air decreases and the noise level increases. For this reason, it has already been provided, to avoid separation of the flow, to accelerate the flow between the inlet and outlet cross sections of the impeller (German Pat. No. 1,576,705, supra). This results in narrow impellers and makes it necessary to use diffusers between the impeller and the radiator.

In annular cooling systems as are currently in use or have been described in the literature, inlet nozzles are sometimes provided (German OLS No. 2,050,265, supra). These nozzles are designed so that there is a good sealing effect between the nozzle and the impeller, in order to keep the slot losses as small as possible. The air slot is consequently as small as possible and usually is also made in the form of a labyrinth seal, which is very costly from the manufacturing standpoint. This slot design is conventional in the construction of pumps and compressors, but requires the use of narrow impellers, in which the flow cannot be retarded in the vicinity of a 90° deflection, or must even undergo acceleration in order to avoid separation at the impeller cover plate. In the case of a delayed flow, a broad, considerably braked boundary layer is produced at the rounded part of the cover plate, whose energy does not suffice to participate in the complete deflection in the radial direction.

In the proposed inlet nozzle, according to the present invention, in conjunction with a broad impeller, a relatively large air gap is provided without a labyrinth seal. The gap air, entering in the axial direction between the nozzle and the impeller cover plate, is supplied tangentially or nearly tangentially to the rounded part of the impeller cover plate. As a result, the slot air flow is drawn against the rounded part of the cover plate by the known Coanda effect, and undergoes a 90° deflection in the radial direction without separation. Simultaneously, the main flow receives an outwardly directed component within the inlet nozzle. The slot flow supplies so much energy to the boundary layer formed at the cover plate that the main flow, despite being delayed in the vicinity of the 90° deflection, is guided through the impeller without separation.

If the impeller mount is firmly connected to the ring radiator, the air gap between the impeller and the inlet nozzle mounted on the ring radiator can be 3 to 10 mm. Good fan efficiency is achieved even at the higher value. No particularly strict requirements are consequently imposed on manufacturing precision.

In other types of installations, the impeller is mounted on the crankshaft or water pump shaft of the internal combustion engine, while the radiator is mounted on the vehicle frame or body. If the inlet nozzle is mounted on the ring radiator, a large air gap, approximately 20 mm, must be provided in view of the relative movements which take place between the nozzle and the radial impeller. However, even with such a large air gap, good efficiency and air delivery are still achieved. The momentum of the powerful slot flow provides a separation-free deflection even with a considerable delay.

Another possibility resides in mounting the inlet nozzle on the engine block, with an elastic connection being provided between the nozzle and the ring radiator.

In conjunction with the proposed inlet nozzle, the main flow can be delayed so markedly in the vicinity of the 90° deflection that the impeller outlet cross section can be made much greater than the axial inlet cross section. However, this results in a much more fully loaded impeller outlet width in contrast to known ring radiator installations, resulting in a number of advantages and improvements, six of which are set out below.

Firstly, the ratio between the widths of the radiator and impeller is reduced, and the load imposed on the radiator is smoothed out as a result, thus increasing the cooling efficiency.

Secondly, the outlet velocity at the impeller is lower, so that the thrust loss caused by the sudden expansion of the cross section is reduced.

Thirdly, the small additional component of the air leaving the radial impeller results in a very flat exit angle, so that the helical path of the air between the impeller outlet and the radiator is increased over known designs, this enabling the air to be distributed better over the width of the radiator.

Fourthly, the considerable delay in the flow within the radial impeller is associated with a considerable static pressure value, so that the impeller can be operated at a relatively low circumferential velocity, and this in turn has a particularly favorable effect upon its noise behavior.

Fifthly, due to the small component of dynamic pressure, as a result of the delay in the impeller, the static efficiency is very high, so that a reduction of the power consumption over conventional cooling systems is likewise achieved.

Sixly, the low dynamic pressure and/or the low radiator inlet velocity likewise contribute to a reduction of the pressure loss and noise level.

Hence, the features of the present invention result in a decrease in radiator resistance over known ring radiator designs, a reduction of the radiator influx velocity, and an increase in the static pressure value of the radial impeller, so that a cooling system of this type operates very quietly, can be made compact and reasonably priced, and requires low operating power.

Experiments with a cooling system designed according to the present invention resulted in a decrease in the noise level by approximately 10 dB(A), occupying the same amount of space as conventional installations with a flat radiator and an axial fan. The radial fan was mounted so that the flow between the nozzle in the cross section and the impeller outlet surface was delayed by approximately one half. No flow separation was observed. The velocity distribution in the radiator was much more uniform than in installations which do not have the features according to the invention.

BRIEF DESCRIPTION OF THE DRAWINGS

Further advantages and features of the invention are described in greater detail hereinbelow with reference to the drawings, which show embodiments in diagramatic form.

FIG. 1 is a somewhat diagramatic, side view of a first embodiment of a cooling system according to the present invention having a ring radiator, radial fan and inlet nozzle;

FIG. 2 is a somewhat diagramatic, front view of the cooling system of FIG. 1;

DETAILED DESCRIPTION OF THE PREFERRED EMBODIMENTS

Figure 3:
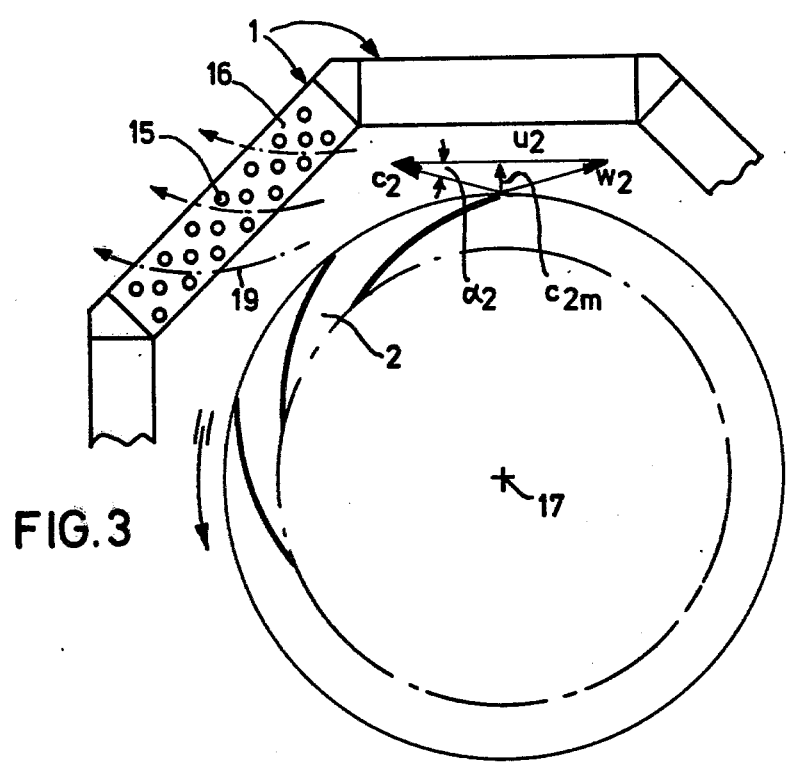
FIG. 3 is a diagram of a velocity triangle at the impeller outlet, shown diagramatically, of the system of FIGS. 1 and 2.

In the embodiment shown in FIG. 1 of a cooling system according to the present invention, a plurality of heat exchanger segments (elements) 1 is assembled to form a polygon or circle, and forms thus a ring radiator. A radial impeller 2 is disposed inside the ring radiator, the impeller 2 being driven by a crank-shaft or water pump shaft 3 of an internal combustion engine partially shown at 4. The radial impeller 2 can be mounted on a separate bearing, which is mounted on the internal combustion engine 4, or constitutes an integrated unit together with the ring radiator.

An air inlet nozzle 5 projects into the radial impeller 2, this nozzle being fastened to the end of the radiator; for example with bolts 6. In the embodiment shown, the heat exchanger segments 1 are connected to two hollow shaped tubes 11 and 12, which serve respectively as manifolds for the cooling water feed and exhaust and simultaneously as supporting and connecting elements.

The back of the ring radiator is sealed by a rear sealing plate 7. In the center of the sealing plate 7 is an opening 28 for the drive shaft 3 of the radial impeller 2. When the device is mounted separately from the internal combustion engine, this mount can be located on the rear sealing plate 7 and the drive shaft 3 can be connected to the drive shaft of internal combustion engine 4 by a conventional V-belt drive, conventional resilient shaft or an articulated shaft (not shown).

The heat exchanger segments 1 are provided laterally with water jackets 8, these jackets serving simultaneously as fastening and connecting members with the collecting tubes 11 and 12 via flanges 10.

The front view of the embodiment of a cooling system according to the invention of FIG. 1, as shown in FIG. 2 illustrates that the heat exchanger segments 1 form a polygon, according the one possible variant of this embodiment. A cooling water feed stub 13 and a cooling water exit stub 14 are connectable by hoses, not shown, to the liquid cooling jacket of internal combustion engine 4.

The heat exchanger segments 1 include, as shown particularly in FIG. 1, cooling water tubes 15, which run parallel to impeller axis 17 and upon which cooling fins 16 are arranged in rows in such manner that they are parallel to air flow 18 leaving the radial impeller 2. In the upper left part of FIG. 2, a cross section taken along section line A—B of FIG. 1 is shown, an arrangement of the cooling water tubes of one of the heat exchanger segments 1 being shown at the upper left. Here the tubes 15 are arranged in rows, one row of the tubes 15 being displaced relative to the adjacent row or rows. However, any other arrangement of the rows of tubes 15 and these tubes themselves, with respect to one another, is also possible. It is especially advantageous if the tubes 15 are designed so that they particularly favor flow of the cooling air, for example if they are round tubes.

In FIG. 3, a velocity triangle is shown at the impeller outlet. The air leaves the radial impeller 2 at a relative velocity $w_2$, while the circumferential velocity of the fan is $u_2$. From $w_2$ and $u_2$ one obtains the absolute velocity $c_2$. Hence, the flow moves at a velocity $c_2$ at an angle $\alpha_2$ to heat exchanger segments 1, shown at the upper left of FIG. 3, and enters these particular heat exchanger segments 1 at approximately this angle $\alpha_2$. Within the heat exchanger, the flow is deflected by the stagnating effect of cooling water tubes 15 and the friction between the fins 16. Flow studies have shown that the cooling air leaves the heat exchanger segments 1 approximately at right angles to the outlet surfaces. The flow path between the radial impeller outlet and the heat exchanger inlet corresponds to a logarithmic spiral. In FIG. 3, this path is shown by arrows 19. The smaller the meridional velocity $c_{2m}$ at the impeller outlet, the flatter the spiral and the greater the increase in the path between the impeller outlet and the heat exchanger segments 1. This favors the spread of the flow from the impeller outlet over the width of the ring radiator.

In order to achieve a low maridional velocity, the radial impeller 2 is made as wide as possible, but only a separation-free flow in the impeller 2 is produced by the connection to the inlet nozzle 5.

Figure 4:
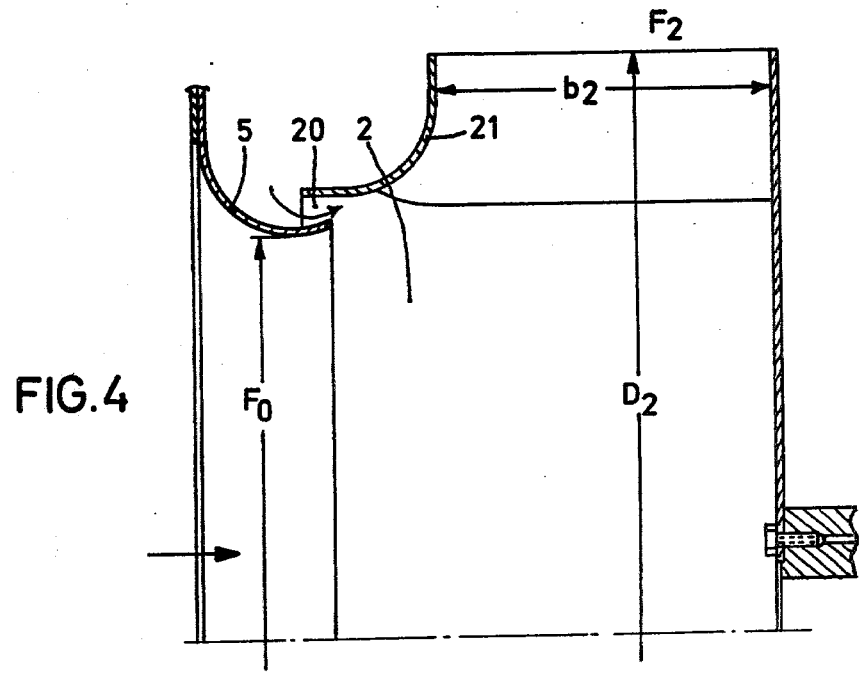
FIG. 4 is a partial view of the inlet nozzle of the system of FIGS. 1 and 2 according to the present invention.

The manner of operation of the inlet nozzle 5 is clearly evident from FIG. 4. At point 20, in other words in the air gap between the radial impeller 2 and the inlet nozzle 5, there is a slot air flow, which favors restriction of the main flow to the rounded part of an impeller cover plate 21, when the inlet nozzle 5 is shaped so that the slot air flow and the main flow contain an outwardly directed component and are supplied tangentially or nearly tangentially to the impeller cover plate 21.

In the case of the described and illustrated form of the nozzle 5, the slot air flow is attracted to the rounded part of the impeller cover plate 21 by the known Coanda effect, and adds so much energy to the main flow that excessive braking of the boundary layer at the rounded part of the cover plate is avoided and separation of the main flow is prevented. This effect makes possible a considerable delay in the deflected flow. As a result, the flow is also separation free, if the blade exit cross section $F_2$ is greater than 1.2 times the narrowest nozzle cross section $F_0$, where $F_2 = D_2 \times b_2 \times \pi$ (with $b_2$ equal to the blade width and $D_2$ equal to the blade outlet diameter). The considerable delay results in a low exit velocity and a high static pressure component, which is desirable for quiet operation and uniform loads upon the radiator.

Figure 5:
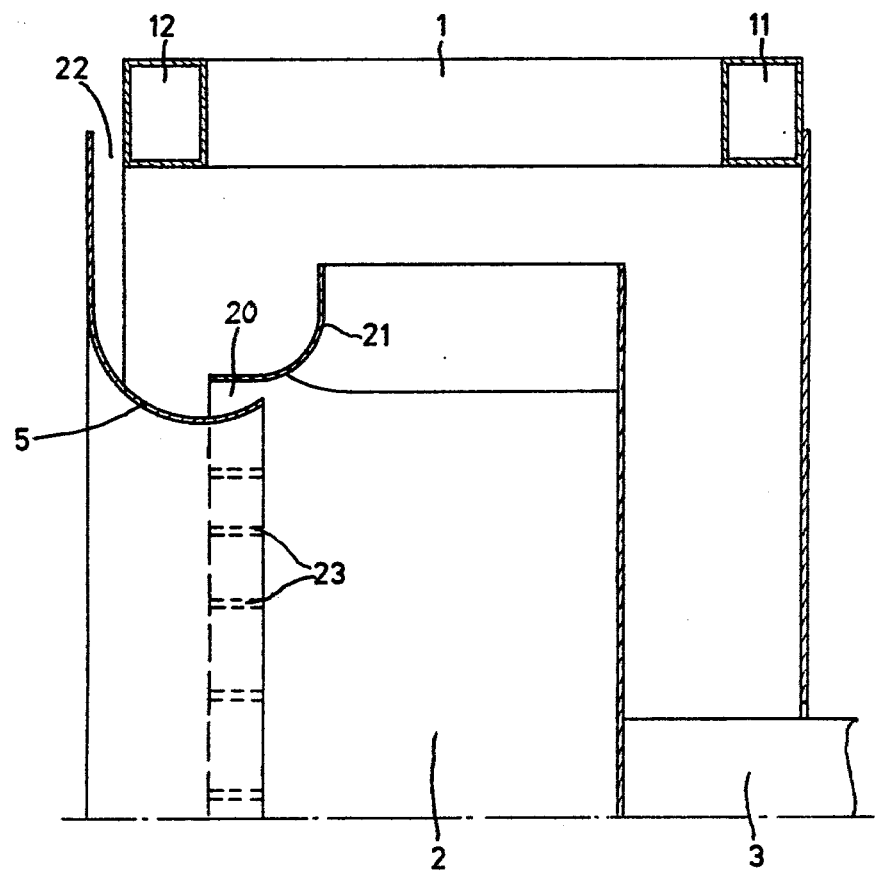
FIG. 5 illustrates an embodiment of a possible mount for a cooling system of the present invention.

With a greater relative motion between the radial impeller 2 and the ring radiator, for example if the radial impeller 2 is mounted on the drive shaft of the internal combustion engine 4 and the radiator, having the heat exchanger segments 1, is mounted on a vehicle frame 25, the inlet nozzle 5 can be fastened on the radial impeller 2 maintaining the relatively narrow air gap 20, as shown in FIG. 5. At point 22, a second air gap develops in the radial direction, through which cold air escapes. The slot air flow can be used to cool the collecting tubes 12.

The inlet nozzle 5, which turns with the fan, is connected by projections 23 to the inside of the impeller cover plate 21.

Figure 6:
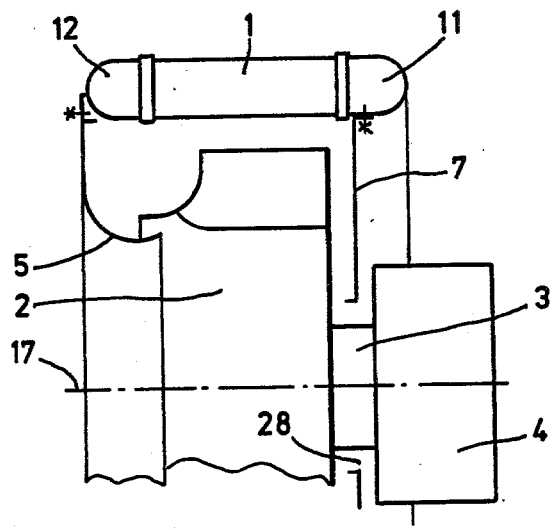
FIGS. 6 and 7 illustrate embodiments of the design of the ring radiator.
Figure 7:
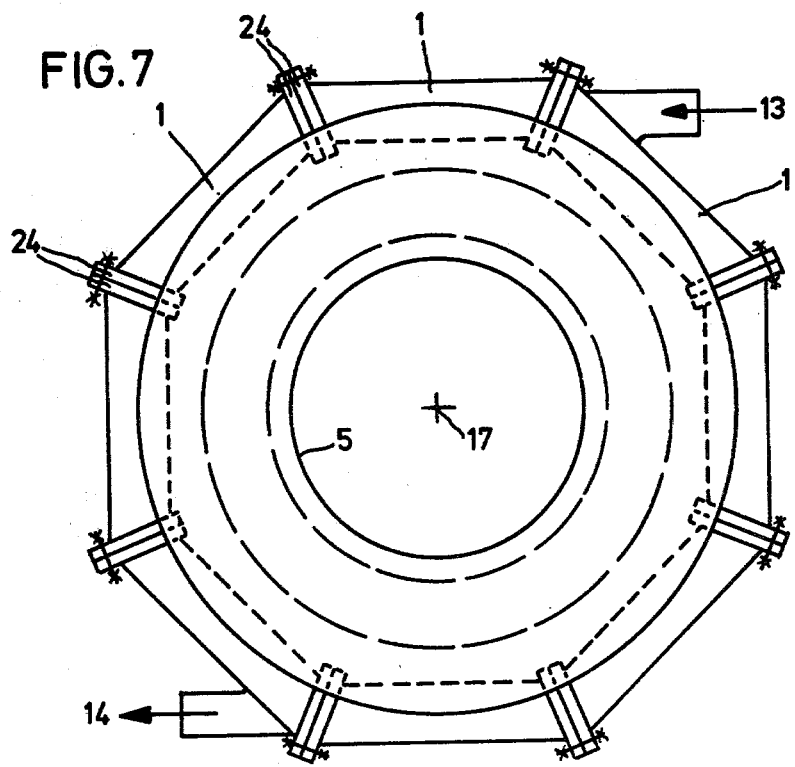

There are other possibilities for the structural design of the ring radiator besides those shown in the embodiment in FIG. 1. In FIGS. 6 and 7, the water jackets 8 themselves form the collecting channels or tubes 11 and 12 and serve simultaneously as connecting members to the adjacent heat exchanger segments 1, in which the water jackets are provided laterally with connecting flanges 24. The mounting of the ring radiator on the vehicle frame 25 is shown, by way of example in FIG. 2, brackets 26 being used for fastening and vibration dampers 27 being provided between these brackets and the vehicle frame 25.

Another possibility for mounting the radiator resides in the fact that the latter can be connected to internal combustion engine 4. In this case, the air gap between the radial impeller 2 and the inlet nozzle 5, which is integral with the radiator, can be kept relatively small, resulting in small slot losses; in other words a good fan efficiency results.

The spirit and scope of the invention is not limited to the embodiments and variants shown in the accompanying drawings and described hereinabove. It is also includes all possible embodiments and variants, as well as partial and subcombinations of the features and measures described and/or shown, its scope being defined in the appended claims.

What is claimed is:

1. In a quiet cooling system for internal combustion engines, the system including a radial impeller having a circumference and a rotational axis, a ring radiator disposed about the circumference of the radial impeller at a distance from the latter, the radiator having cooling water tubes which are to carry water, and cooling fins fastened to the tubes, wherein said cooling water tubes run substantially parallel to said rotational axis of said impeller and said fins are located parallel to flow direction of cooling air leaving said radial impeller, the improvement wherein said radial impeller is provided with a cover plate having a rounded portion and including an inlet nozzle which projects into said radial impeller, said inlet nozzle being shaped to define a gap between said radial impeller and said inlet nozzle so that the main flow receives an outwardly directed component and the air entering between said impeller and said nozzle is supplied at least nearly tangentially to said rounded portion of said cover plate, and wherein said inlet nozzle is connected to said cover plate of said radial impeller and turns with the latter.

2. An improved cooling system according to claim 1, including water manifold means, and a second gap provided between said manifold means and said nozzle to assure air flow past said manifold means to cool said manifold means.

3. An improved cooling system according to claim 1, wherein the ratio of the outlet surface ($F_2$) of said impeller to the narrowest cross section ($F_0$) of said inlet nozzle is greater than 1.2.

4. An improved cooling system according to claim 1, wherein said ring radiator includes individual cooling segments disposed on the circumference of a frame consisting of lightweight members, said frame being mounted in the form of a ring at a distance from the circumference of said impeller.

5. An improved cooling system according to claim 1, wherein said ring radiator includes individual cooling segments disposed on the circumference of a frame consisting of lightweight members, said frame being mounted in the form of a polygon at a distance from the circumference of said impeller.

6. An improved cooling system according to claim 1, wherein said cooling water tubes have a configuration in cross section which favors flow of cooling air.

7. An improved cooling system according to claim 6, wherein said cooling water tubes are substantially circular in cross section.

8. An improved cooling system according to claim 1, wherein said cooling water tubes are hollow frame parts which constitute a water distributing system.

9. An improved cooling system according to claim 1, including an inlet nozzle, and wherein said radial impeller is mounted on a drive shaft extending out from an internal combustion engine housing and said inlet nozzle and said ring radiator are mounted on the engine block of said engine.

10. An improved cooling system of claim 1, including an inlet nozzle, and wherein said radial impeller is mounted on a drive shaft extending out from an internal combustion engine housing and said inlet nozzle and said ring radiator are mounted on a vehicle frame.

11. An improved cooling system of claim 1, including an inlet nozzle, and wherein said radial impeller is mounted on a drive shaft extending out from an internal combustion engine housing and said inlet nozzle and said ring radiator are mounted on a vehicle frame and the engine block of said engine.

12. A cooling system for internal combustion engines, comprising a radial impeller and a ring radiator disposed about the circumference of said radial impeller and spaced apart therefrom, said radiator being embodied in at least one piece and including water-carrying tubes and cooling fins fastened to the tubes, characterized in that the radial impeller (2) is provided with a cover plate (21), which has a rounded neck-like portion in the opening of which an inlet nozzle (5) projects, and that the inlet nozzle (5) is shaped and inwardly radially positioned with respect to said neck-like portion of said cover plate to provide an opening (20) whereby slot air flow passing between the rounded portion and the inlet nozzle (5) and said cover plate (21) and the main flow receive an outwardly directed component and the slot air flow is supplied substantially tangetially onto the rounded portion.

13. A cooling system according to claim 12, wherein said at least one piece comprises a plurality of segments, said segments comprising individual cooling elements directly connected with one another on water jackets, said water jackets forming a water distribution channel.

14. A cooling system in accordance with claim 12, characterized in that the inlet nozzle (5) is connected to the cover plate (21) of the radial impeller (2) and rotates therewith.

15. A cooling system according to claim 12 or 14, characterized in that the ratio of the impeller outlet surface ($F_2$) to the narrowest cross section ($F_o$) of the inlet nozzle (5) is greater than 1.2:1.

16. A cooling system according to claim 12, characterized in that individual cooling elements (1) are disposed on the circumference of a frame consisting of lightweight members in the form of a ring or a polygon at a distance from the circumference of the impeller.

17. A cooling system in accordance with claim 12 or claim 14, characterized in that the cooling water tubes (15) have a configuration in cross section on the side of the cooling air which is favorable to the flow.

18. A cooling system according to claim 15, characterized in that the colling water tubes (15) are embodied as round tubes.

19. A cooling system in accordance with claim 12 or claim 14, characterized in that the cooling water tubes are located parallel to the axis of the fan and the fins (16) are located parallel to the flow direction of the cooling air leaving the radial impeller (2).

20. A cooling system in accordance with claim 16, characterized in that the frame members are embodied as hollow and constitute a water distributing system.

21. A cooling system according to claim 12 or claim 14, characterized in that the individual cooling elements are directly connected with one another on water jackets and the water jackets constitute a water distributing channel.

22. A cooling system according to claim 12, characterized in that the radial impeller (2) is mounted in a drive shaft protruding from the internal combustion engine housing and the inlet nozzle (5) and the ring radiator are secured to the engine block.

23. A cooling system according to claim 22, wherein said inlet nozzle (5) is fastened on said ring radiator.

24. A cooling system according to claim 12 characterized in that a gap (22) is provided of such a nature that a second slot air flow serves to cool a collecting tube (12).

25. A cooling system according to claim 12, characterized in that the radial impeller (2) is mounted on a drive shaft protruding from the internal combustion engine housing and the inlet nozzle (5) and the ring radiator are secured to the vehicle frame.

* * * * *